(12) United States Patent
Colbath

(10) Patent No.: US 12,137,777 B2
(45) Date of Patent: Nov. 12, 2024

(54) THREE-DIMENSIONAL INCLINED FOOT SCANNER

(71) Applicant: APTULUM, LLC, Flagstaff, AZ (US)

(72) Inventor: Megan L. Colbath, Flagstaff, AZ (US)

(73) Assignee: Aptulum, LLC, Flagstaff, AZ (US)

( * ) Notice: Subject to any disclaimer, the term of this patent is extended or adjusted under 35 U.S.C. 154(b) by 0 days.

(21) Appl. No.: 16/642,174

(22) PCT Filed: Sep. 7, 2018

(86) PCT No.: PCT/US2018/050105
§ 371 (c)(1),
(2) Date: Feb. 26, 2020

(87) PCT Pub. No.: WO2019/051329
PCT Pub. Date: Mar. 14, 2019

(65) Prior Publication Data
US 2021/0076777 A1    Mar. 18, 2021

Related U.S. Application Data

(60) Provisional application No. 62/725,796, filed on Aug. 31, 2018, provisional application No. 62/555,380, filed on Sep. 7, 2017.

(51) Int. Cl.
| A43D 1/02 | (2006.01) |
| G01B 11/24 | (2006.01) |
| H04N 13/243 | (2018.01) |

(52) U.S. Cl.
CPC .............. *A43D 1/025* (2013.01); *G01B 11/24* (2013.01); *H04N 13/243* (2018.05)

(58) Field of Classification Search
CPC . A43D 1/025; A43D 1/00; A43D 1/02; G01B 11/24; H04N 13/243; A61B 5/1074
(Continued)

(56) References Cited

U.S. PATENT DOCUMENTS

| 5,025,476 A | 6/1991 | Gould et al. |
| 5,164,793 A | 11/1992 | Wolfersberger et al. |

(Continued)

FOREIGN PATENT DOCUMENTS

| CN | 101352277 B | 1/2009 |
| CN | 104366906 B | 2/2015 |

(Continued)

OTHER PUBLICATIONS

Machine translation of CN 204635264 U (Year: 2015).*
(Continued)

*Primary Examiner* — Christopher S Kelley
*Assistant Examiner* — Ana Picon-Feliciano
(74) *Attorney, Agent, or Firm* — Attentive Law Group, PLLC; Michael Malyar

(57) ABSTRACT

An adjustable inclined foot scanner includes a frame having a connected platform, a positionally adjustable rear foot support connected to the frame and movable with respect to the platform, a heel support pivotally mounted on the rear foot support, a three-dimensional camera scanning system for covering a majority of a user's foot, the scanning system including a frontal foot scanning assembly, an under-foot scanning assembly for covering at least an arch portion of the user's foot, and a rear foot scanning assembly.

18 Claims, 9 Drawing Sheets

(58) Field of Classification Search
USPC .......................................................... 348/48
See application file for complete search history.

(56) References Cited

U.S. PATENT DOCUMENTS

| | | | |
|---|---|---|---|
| 5,457,325 | A | 10/1995 | Huberty |
| 5,689,446 | A | 11/1997 | Sundman et al. |
| 5,911,126 | A | 6/1999 | Massen |
| 6,289,107 | B1 | 9/2001 | Borchers et al. |
| 6,909,513 | B1 | 6/2005 | Fujita et al. |
| 7,325,323 | B2 | 2/2008 | Katsu et al. |
| 7,536,794 | B2 | 5/2009 | Hay et al. |
| 7,978,378 | B2 | 7/2011 | Pishdadian et al. |
| 9,778,027 | B1 * | 10/2017 | Smith .................. A61B 5/6829 |
| 2008/0028625 | A1 | 2/2008 | Nudelman et al. |
| 2008/0114269 | A1 * | 5/2008 | Martindale .......... A61B 5/4528 600/592 |
| 2010/0106061 | A1 | 4/2010 | Lott et al. |
| 2010/0229422 | A1 | 9/2010 | Goonetilleke et al. |
| 2016/0113584 | A1 | 4/2016 | Galasso |
| 2017/0272728 | A1 * | 9/2017 | Rafii ................... H04N 13/239 |
| 2017/0360298 | A1 * | 12/2017 | Mougin ............... A61B 5/1079 |
| 2019/0191823 | A1 * | 6/2019 | Kasuya ................ A61B 5/1074 |
| 2019/0209093 | A1 * | 7/2019 | Watts ..................... A61B 5/706 |

FOREIGN PATENT DOCUMENTS

| | | | |
|---|---|---|---|
| CN | 204635264 | U * | 9/2015 |
| CN | 105212436 | B | 1/2016 |
| CN | 105533917 | A | 5/2016 |
| CN | 106510098 | A | 3/2017 |
| CN | 106901445 | A | 6/2017 |
| CN | 107095393 | A | 8/2017 |
| CN | 108113120 | A | 6/2018 |
| EP | 3003127 | B1 | 1/2017 |
| FR | 3009168 | B1 | 2/2015 |
| FR | 3053816 | A1 | 1/2018 |
| GB | 2417153 | A | 2/2006 |
| GB | 2417153 | B1 | 3/2007 |
| JP | 2004003086 | A | 1/2004 |
| KR | 1020140010684 | A | 1/2014 |
| KR | 20170007895 | A | 1/2017 |
| KR | 101759960 | B1 | 7/2017 |
| KR | 101803292 | B1 | 12/2017 |
| KR | 101828785 | B1 | 2/2018 |
| WO | 2018020083 | A2 | 2/2018 |

OTHER PUBLICATIONS

International Application No. PCT/US18/50105, International Search Report and Written Opinion mailed Nov. 5, 2018, 11 pages.
Henderson et al., "A Biomechanical Evaluation of Standing in High- Heeled Shoes," ResearchGate, 2004, pp. 25-38.
Lee et al., "Biomechanical effects of wearing high-heeled shoes," Elsevier, International Journal of Industrial Ergonomics, 2001, pp. 321-326.
Yung-Hui et al., "Effects of shoe inserts and heel height on foot pressure, impact force, and perceived comfort during walking," Elsevier, Applied Ergonomics, 2005, pp. 355-362.
Witana et al., "Footbed Shapes for Enhanced Footwear Comfort," Ergonomics, 2009, pp. 1-12.
Weerasinghe et al., "Getting to the Bottom of Footwear Customization," J. Syst Sci Syst Eng, pp. 1-13.
Cavanagh et al., "Pressure Distribution Under Sympton-Free Feet During Barefoot Standing," American Orthopaedic Foot and Ankle Society, Inc., 1987, pp. 1-15.
Thompson et al., "The High Price of High-Fashion Footwear," JB&JS, 1994, pp. 1586-1593.
Speksnijder et al., "The Higher the Heel the Higher the Forefoot-Pressure in Ten Healthy Women," Elsevier, The Foot, 2007, pp. 17-21.
Michelle W. Whittle, "The Use of Viscoelastic Materials in Shoes and Insoles," Magister Corp, 1996, pp. 1-2.
Witana et al., "Think high-heels are uncomfortable?," ResearhGate, 2009, pp. 1-6.

* cited by examiner

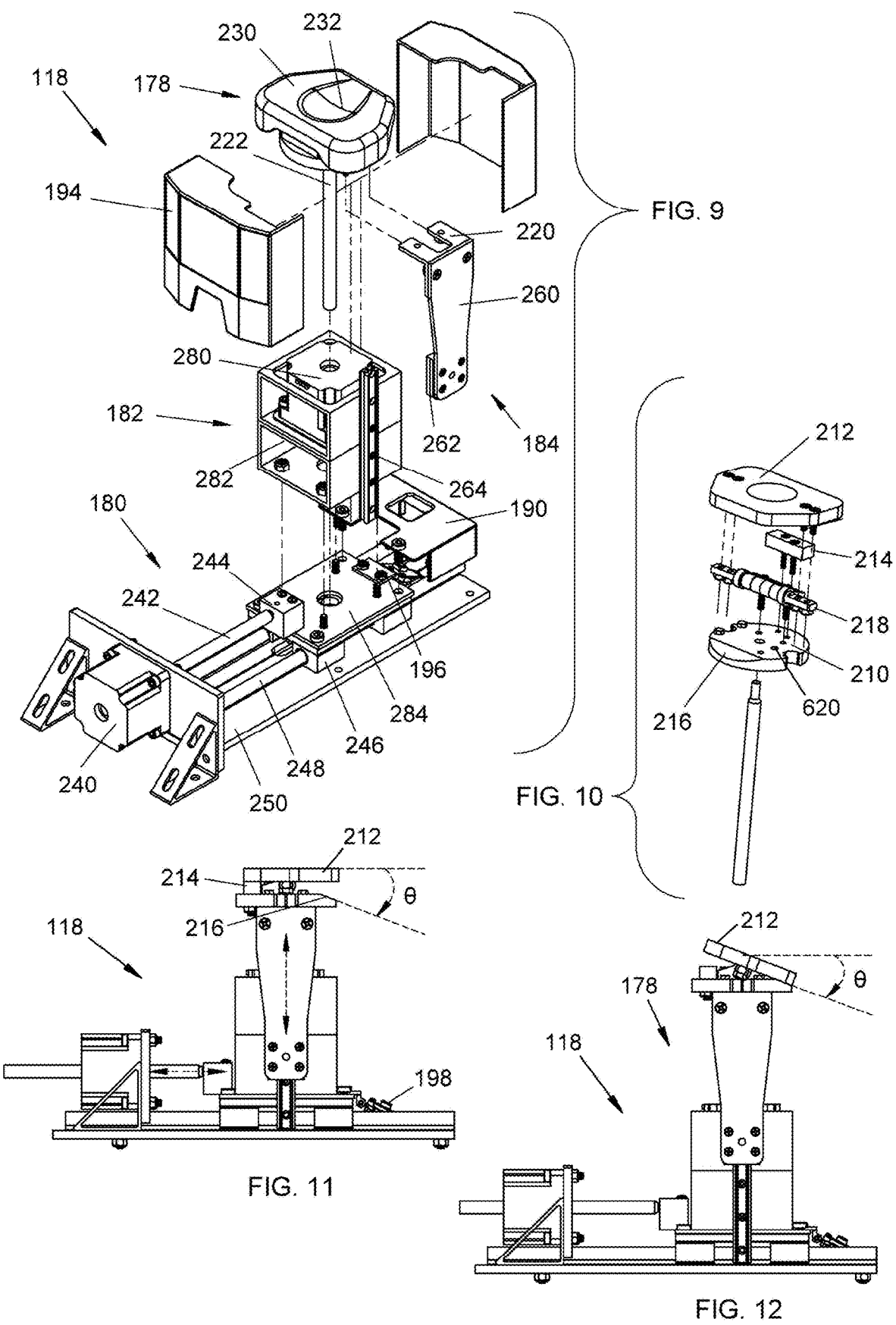

Please provide your customer information
First Name
Last Name
Email
Please select your nearest athletic shoe size ( 4-12 )  [ 4 ▽ ]
Select the heel heights for scanning   ○ 0 in   ○ 1 in   ○ 2 in   ○ 3 in   ○ 4 in
OR
Input the heel heights of your preference in inches  [          ] inches
FIG. 13
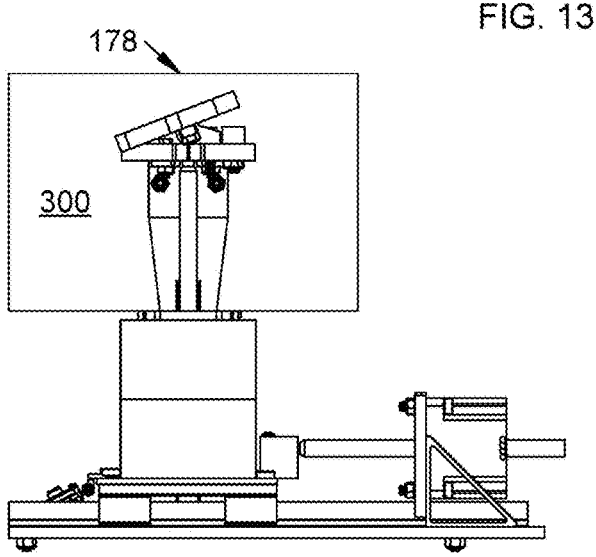
FIG. 14
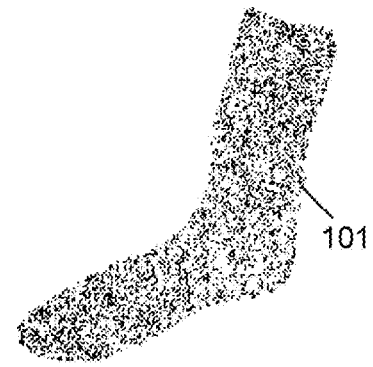
FIG. 15
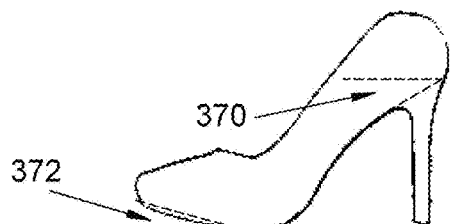
FIG. 16
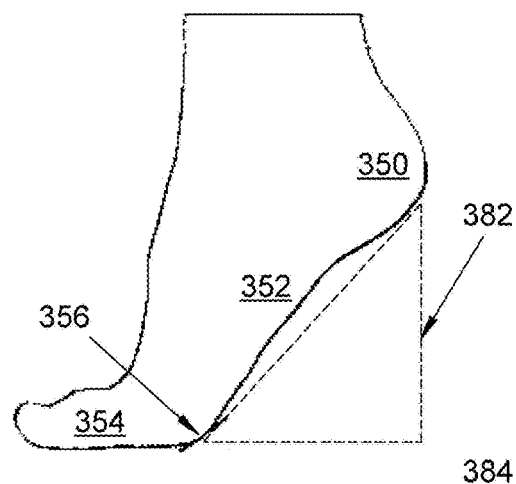
FIG. 17 y - heel height
x - new horizontal length

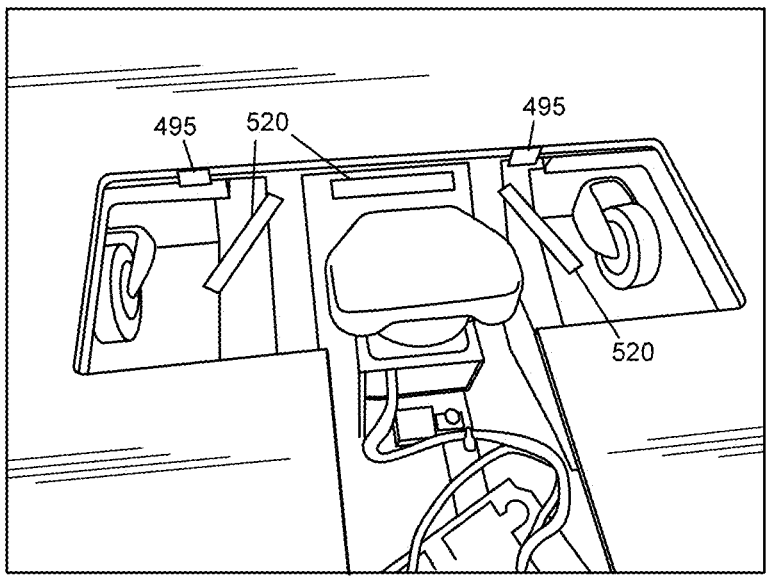
FIG. 20
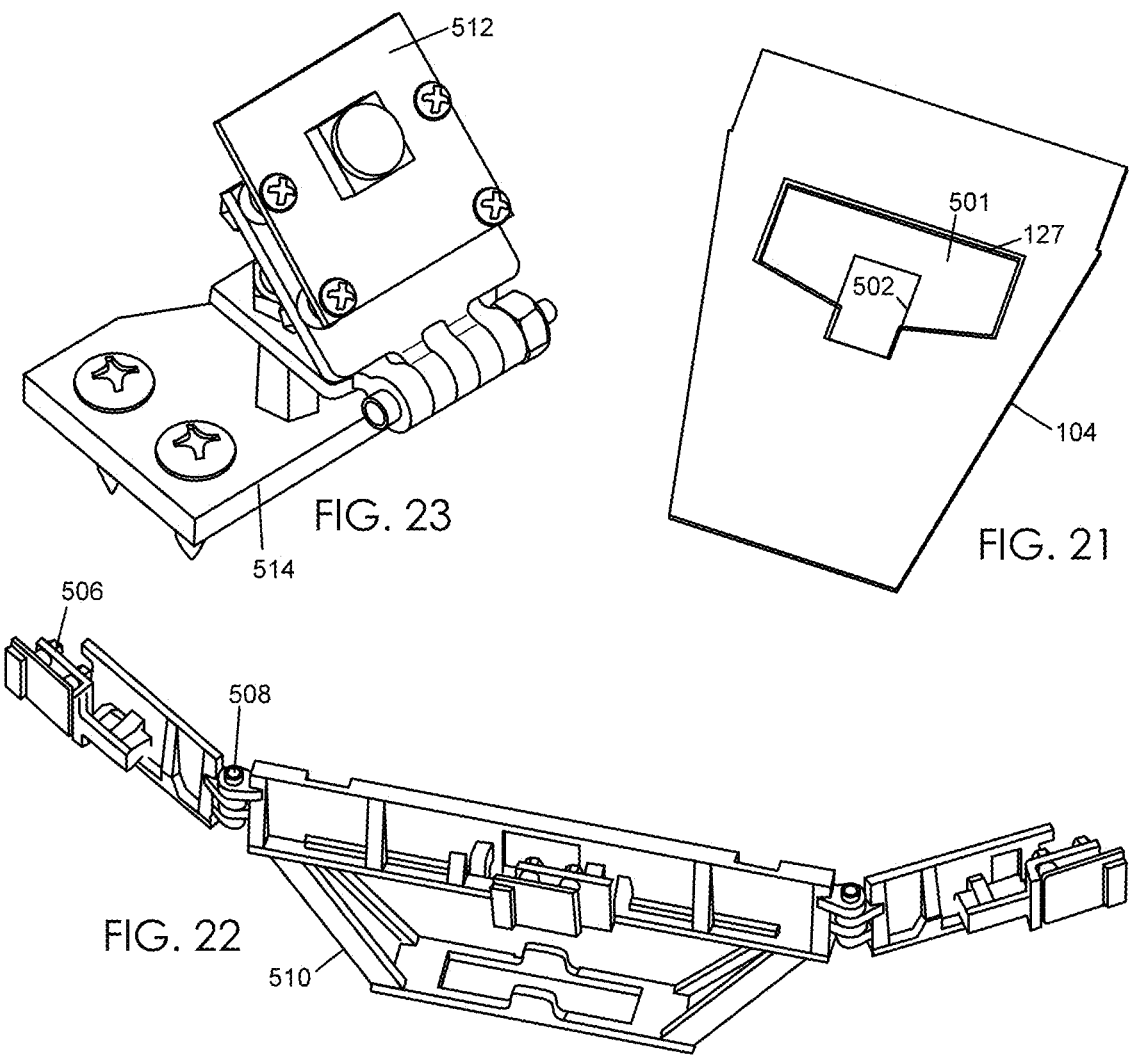
FIG. 21
FIG. 23
FIG. 22

Heel support with no position concavity

Heel positioning concavity equal to or above the heel height

Heel positioning concavity below the heel height

THREE-DIMENSIONAL INCLINED FOOT SCANNER

CROSS REFERENCE TO RELATED APPLICATIONS

The present application is a national phase filing under 35 U.S.C. § 371 of International Application No. PCT/US18/50105 filed on Sep. 7, 2018, which claims the benefit of U.S. Provisional Application Ser. Nos. 62/555,380, filed Sep. 7, 2017 and 62/725,796 filed Aug. 31, 2018, the disclosures of which are expressly incorporated herein by reference in their entireties.

FIELD OF THE INVENTION

The present invention relates to three-dimensional scanners and, more particularly, to three-dimensional foot scanners. One embodiment of the three-dimensional foot scanner of the present invention will scan feet in the same inclined position observed when wearing high-heeled footwear.

BACKGROUND

Conventional three-dimensional foot scanners typically scan feet in a flat-footed position. These scanners capture data to be used to create digital lasts. A digital last is a virtual three-dimensional representation of a foot and can be used to determine the size, shape, and fit of custom footwear, insoles, and other custom footwear components. However, deviations in size and shape between the digital last and the foot can result in ill-fitting, uncomfortable footwear and footwear components. This problem is especially prevalent when attempting to create custom high-heeled footwear from a flat-foot digital last. More particularly, while it is possible to digitally manipulate a flat-foot digital last to model custom footwear and footwear components in an inclined position, this leads to inaccuracy, increased difficulty, and often results in uncomfortable and painful footwear and footwear components. Thus, there remains a need in the art for three-dimensional foot scanners capable of creating accurate digital lasts capable of modeling an inclined foot to be used for the creation of custom high-heeled footwear, insoles and high-heeled footwear components.

There are two major challenges to providing scanning data to develop custom footwear. The first challenge is to develop a scanning technique that provides the most accurate scan of the inclined foot that is technically and economically feasible. The second challenge is to ensure that the foot, when scanned, is in a position that will maximize podiatric health and comfort at a given heel height.

SUMMARY OF THE INVENTION

In a preferred embodiment, an adjustable inclined foot scanner is provided with a frame having a connected platform, a positionally adjustable rear foot support connected to the frame and movable with respect to the platform in a first plane about vertical and horizontal axes, a heel support pivotally mounted on the rear foot support along a pivotal axis perpendicular to the first plane, a three dimensional camera scanning system for covering a majority of the foot, the scanning system including a frontal foot scanning assembly, an under-foot scanning assembly for covering at least an arch portion of the foot, and a rear foot scanning assembly.

In other embodiments, the underfoot assembly or the rear scanning assemblies or both are connected to the rear foot support. In another embodiment, the platform or the rear foot support has a weight sensor. In further embodiments, both the platform and the rear foot support have a weight sensor. In other embodiments, the heel support of the foot scanner includes a positioning concavity. In further embodiments, the positioning concavity is located at a height equal to or above a heel seat plane of the heel support, while in other embodiments, the positioning concavity is located at a height below the heel seat plane of the heel support. In other embodiments, the heel support of the foot scanner is adjustable, and can be automatically adjustable. The heel support can be adjustable as a function of at least one of a set of variables including shoe length size, shoe width size, designated shoe material, shoe wearer total weight, weight force on the platform, weight force on the rear foot support, ratio of weight force on platform versus weight force on the rear foot support, heel height of the rear foot support, heel support positioning concavity, and heel support positioning concavity in relationship to a heel seat plane.

In further embodiments, the foot scanner includes a weight sensor for a user's opposite foot that is not being scanned in order to aid in determining proper weight force distribution between the foot being scanned and the foot not being scanned.

In various other embodiments, the foot scanner includes a programmed user interface.

In further embodiments, the foot scanner includes at least one camera target, such as a RAD target, to align at least one camera.

In yet another embodiment, a method of three-dimensional scanning of a foot comprises providing a frame capable of retaining a user's foot in an inclined positioned, the frame having a raised platform, a height adjustable rear foot support connected to the raised platform, wherein the rear foot support is offset from the raised platform, and at least two cameras connected to a processor that is capable of providing instructions to the at least two camera, and directing the at least two cameras to perform a foot scan according to pre-programmed instructions, to create a digital last of the user's foot in the inclined position.

In various other embodiments, the foot scanner as described in any of the embodiments above can be used to three-dimensionally scan a foot.

In further embodiments, the method includes confirming the proper weight force distribution between the foot being scanned and the foot not being scanned, and initiating scanning of the foot. In other embodiments, the method includes confirming the proper weight force distribution between the platform and the rear foot support, and initiating scanning of the foot. In further embodiments, the method includes allowing the heel support to assume a natural position, and initiating scanning of the foot. In further embodiments, the method includes defining a desired heel support angle from at least one of a group of variables including shoe length size, shoe width size, designated shoe material, shoe wearer total weight, weight force on the platform, weight force on the rear foot support, ratio of weight force on platform versus weight force on the rear foot support, heel height of the rear foot support, heel support positioning concavity, and heel support positioning concavity in relationship to a heel seat plane, adjusting the heel support to the desired angle, and initiating scanning of the foot.

In another embodiment, an adjustable inclined foot scanner comprises a frame having a raised platform, and a height adjustable rear foot support with a pivotal heel support connected to the rear foot support, wherein the height adjustable rear foot support is offset from the raised platform, and two or more camera devices capable of utilizing a method incorporating an algorithm for initializing a three-dimensional scan and data capture, wherein the algorithm is capable of arranging the captured data in a manner specific to the method such that the three-dimensional scan covers a majority of the foot including the arch, and further comprising one or more camera sub-assemblies connected to the rear foot support, wherein the one or more sub-assemblies include at least one camera and one or more paths for the horizontal and vertical translation of the rear foot support in relation to the raised platform, and a user interface for triggering the data capture method.

Various embodiments of the three-dimensional inclined foot scanner of the present invention may also have one or more of the following features:

- The user's foot may be oriented in an inclined position equivalent to that observed in individuals wearing high-heeled footwear.
- The user's foot can be supported under the forefoot and heel alone, allowing the arch of the foot to be scanned.
- Support structure for the heel can be mounted via a freely rotating friction hinge.
- Under a user's body weight, the heel support rotates to a natural wedge angle based on a combination of the user's foot shape and heel height position.
- The scanner can be portable.
- The base of the scanner may be folded into an A-frame for easy transportation. Conversely, the scanner may be fixed in a particular location.
- Three-dimensional scanning may occur nearly instantaneously, thereby reducing inaccuracies caused by micro-movements in the foot during scanning, and also providing a rapid scanning experience.
- The scanner may include various camera positions that are optimized for foot scanning, thereby reducing the number of required cameras while maintaining accuracy of the scan.
- The scanner may include a weight-bearing structure that allows the user to evenly distribute body weight between the user's feet.
- The user's feet may be scanned at an incline with full weight-bearing pressure, ensuring that the scanned image of the user's foot shape most closely matches the user's foot shape observed while the user is wearing high heel footwear.
- Vertical and horizontal positioning of the heel support may be controlled independently. Independent axis control allows for infinite positioning within a plane of motion. The heel support can follow linear and non-linear paths.
- Uniquely patterned socks may be included that optimize scanning accuracy.
- Integrated hand holds on the scanner may provide optional balance and stability for the user.
- Use of the three-dimensional foot scanner may occur through a pre-programmed, touchscreen, GUI interface.

Other features and aspects of this disclosure will be apparent from the following non-limiting description and accompanying drawings.

BRIEF DESCRIPTION OF THE DRAWINGS

FIG. 9 is an exploded perspective view of a rear foot support of the present invention;

FIG. 10 is an exploded perspective view of a pivotal heel support of the present invention;

FIG. 11 is a side elevational assembled view of the rear foot support shown in FIG. 9;

FIG. 12 is a side elevational assembled view of the rear foot support shown in FIG. 9 with the pivotal heel support of the invention in a weight-bearing state and translated;

FIG. 13 is an image of a graphical user interface of a scanner of the present invention;

FIG. 14 is a side elevational view of the scanner shown in FIG. 9 illustrating a plane of adjustment of the rear foot support;

FIG. 15 is a perspective view of a sock utilized with the scanner of the present invention;

FIG. 16 is a side schematic view of a high heel shoe;

FIG. 17 is a side schematic view of a user's foot in an inclined position;

FIG. 20 is a perspective view of an alternative embodiment of a base assembly portion of the scanner of FIG. 1;

FIG. 21 is a perspective view of an alternative embodiment of a top panel portion of the scanner of FIG. 1;

FIG. 22 is a perspective view of a hinged camera unit stand of the present invention;

FIG. 23 is a perspective view of a camera unit stand on a ball joint of the present invention;

and

Figure 27A:
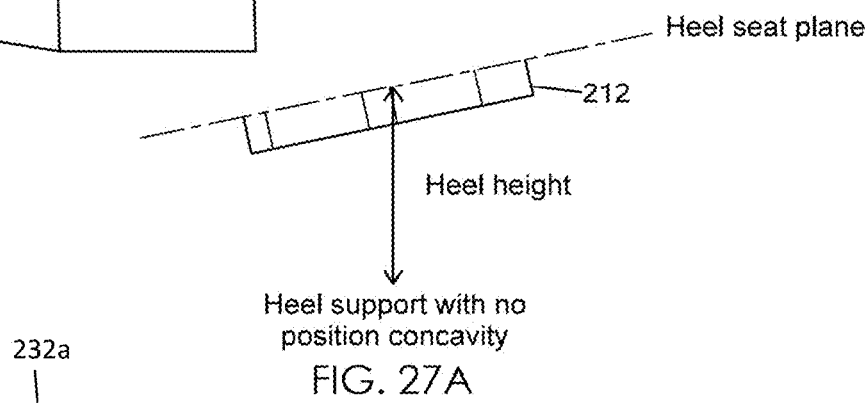
FIG. 27A is a side schematic view of a pivotal heel support without a heel positioning concavity.
Figure 27B:
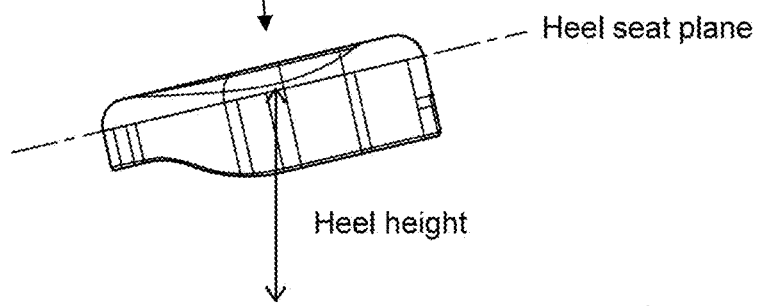
FIG. 27B is a perspective side view of a pivotal heel support with a heel positioning concavity above heel height.
Figure 27C:
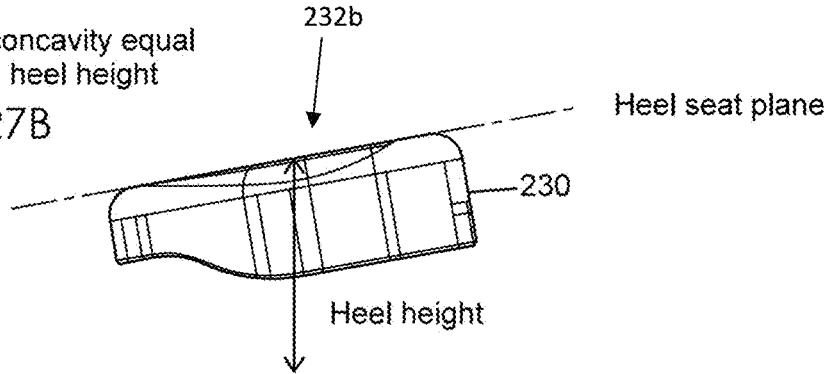

FIG. 27C is a perspective side view of a pivotal heel support with a heel positioning concavity below heel height.

DETAILED DESCRIPTION

FIGS. 16 and 17 are included for reference, and are schematic diagrams containing common terminology used to describe areas of the foot and high heeled shoes. Angle 372 is commonly referred to as the toe angle or toe spring of the shoe. Both terms are used interchangeably. Angle 370 is typically referred to as the wedge angle, with the lower line being referred to as the heel seat plane. Item 354 is referred to as the forefoot, item 352 is the arch, and item 350 is the heel. Item 382 is the heel height. Item 356 is referred to as the joint line.

Figure 19:
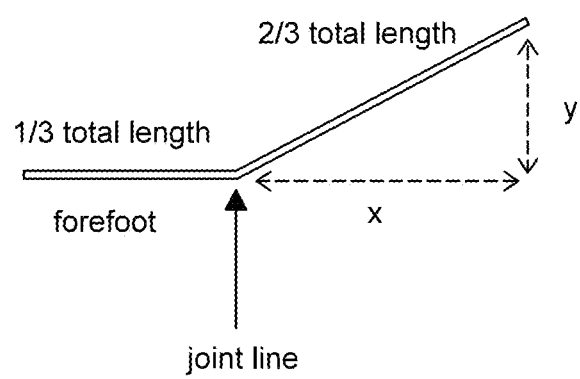
FIG. 19 is a schematic representation of certain dimensions of an inclined foot.

FIG. 19 is included for reference and describes a foot in an inclined position where x is the horizontal length of the hindfoot and y is the heel height. The joint line, which goes into the page of the figure, divides the forefoot, which remains flat during inclination of the foot, and the hindfoot, which is sloped during inclination of the foot.

FIGS. 1-8 illustrate a three-dimensional inclined foot scanner 100 according to an embodiment of the present invention. The foot scanner 100 includes a structural frame 140 (see FIG. 8) adapted to house and provide stability to the scanner 100. The frame 140 provides rigidity and form to the scanner 100 and allows for one or more cover panels 122 to be attached thereto. The scanner 100 is further comprised of a vertical frame assembly 102 having a first end 108 and a second end 110 opposite the first end 108, and a folding base assembly 104 having a first end 112 and a second end 114 opposite the first end 112. The base assembly 104 has a top panel 130 and a base plate 168. The first end 108 of the vertical frame assembly 102 and the first end 112 of the base assembly 104 are connected by a hinge 142. In one embodiment, the frame assembly 102 and the base assembly 104 are generally trapezoidal in shape. The first ends 108, 112 of each of the frame assembly 102 and the base assembly 104, respectively, have larger widths at the first ends 108, 112 thereof. Similarly, the second ends 110, 114 of the frame assembly 102 and the base assembly 104 have smaller widths at the respective second ends 110, 114 thereof. Other general shapes are envisioned such as square, rectangular, or any other shape known in the art. As will be evident to one skilled in the art, regardless of the particular shape chosen for the assembly 102 and assembly 104, the frame 140 will be of a similar shape to both the assembly 102 and the assembly 104. The hinge 142 is mounted such that the second end 112 of the base assembly 104 can be lifted upward, rotating about the hinge 142 approximately 90 degrees such that the second end 112 of the base assembly 104 rests within the frame assembly 102 when the scanner 100 is in a closed position (see FIG. 5).

Figure 3:
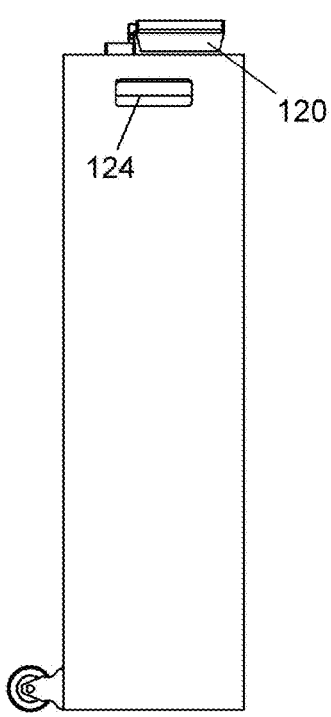
FIG. 3 is a side elevation view of the scanner shown in FIG. 1 in a closed position.
Figure 4:
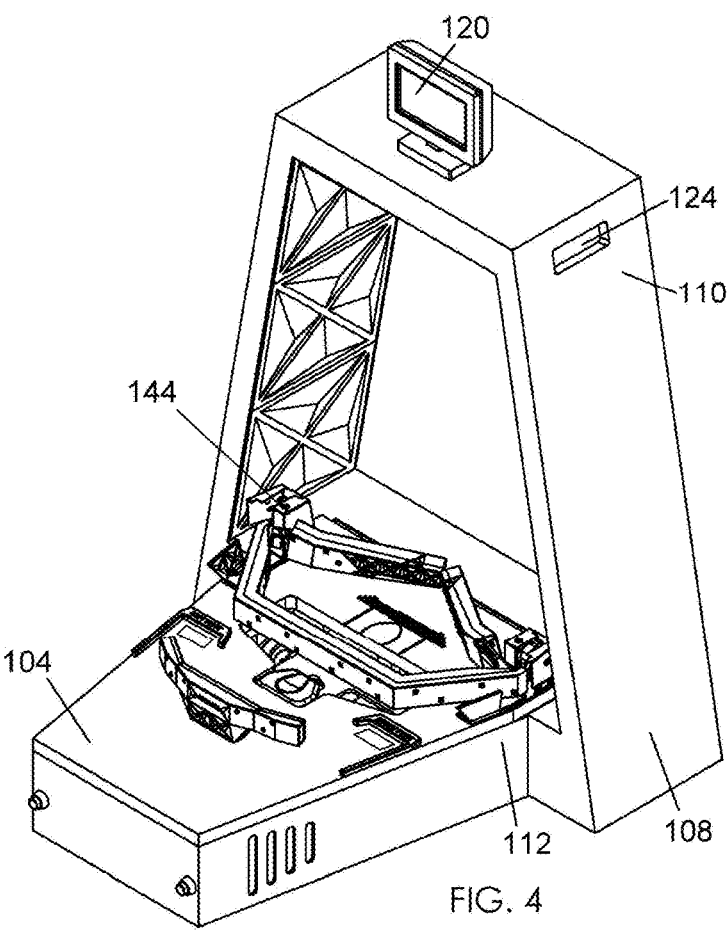
FIG. 4 is a view similar to that of FIG. 1 with the camera sub-assemblies shown folded.
Figure 5:
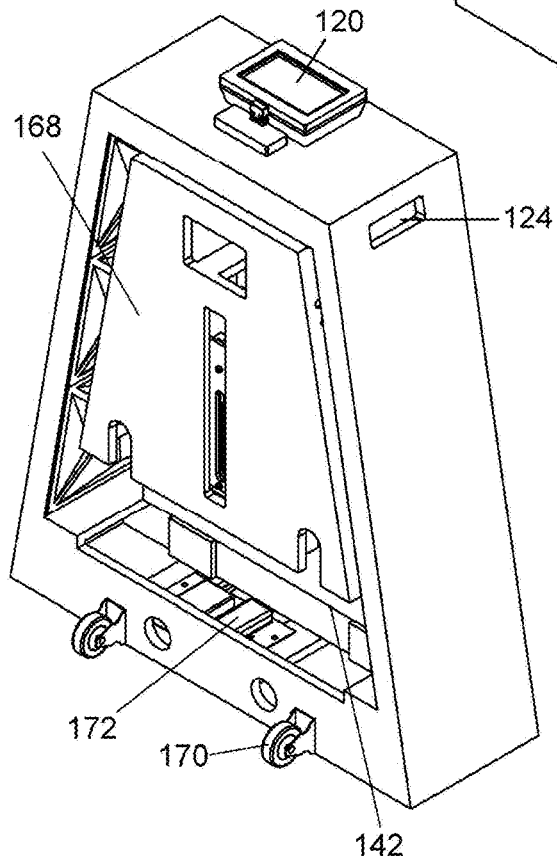
FIG. 5 is a frontal perspective view of the scanner shown in FIG. 3.
Figure 6:
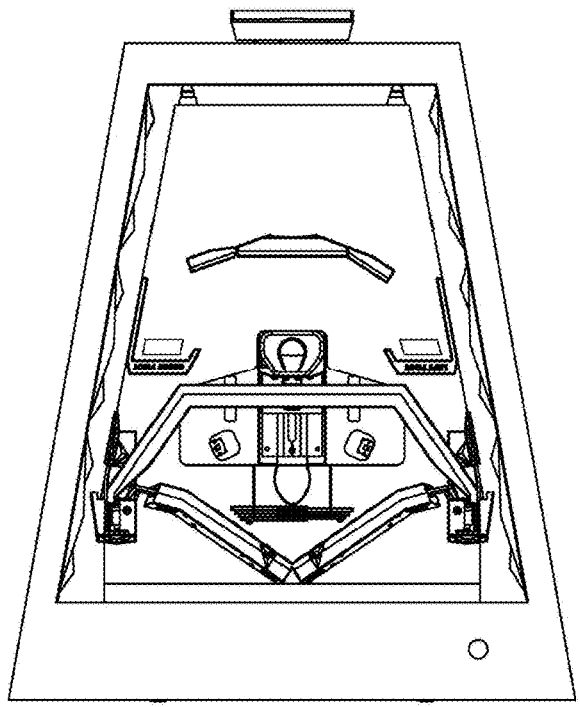
FIG. 6 is a rear elevational view of the scanner shown in FIG. 3.

FIGS. 3, 5 and 6 depict the scanner 100 of the present invention in its closed position.

Figure 8:
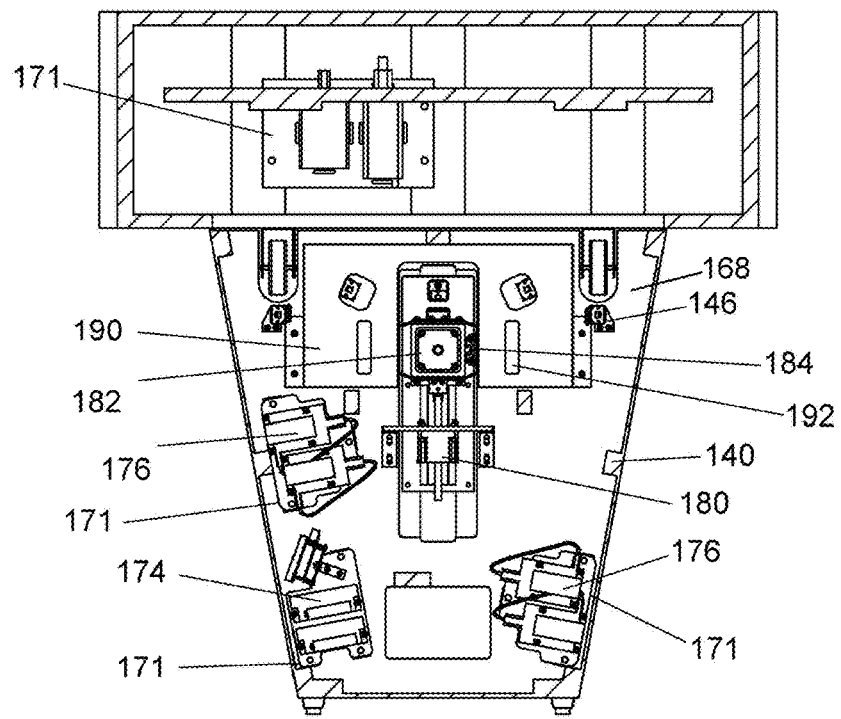
FIG. 8 is a top sectional view taken along line 8-8 of FIG. 7.

One or more cover panels 122 can be attached to the structural frame 140 in FIG. 8. The cover panels 122 can be made of hardwood or plywood, but may also be made of any other material of sufficient strength and rigidity capable of supporting the weight of a user. The structural frame 140 may also be made of wood, but may be made of any other material that can support a user's body weight.

In one embodiment, one or more ventilation openings 126 can be cut into the cover panels 122 attached to the base assembly 104 to allow airflow within the base assembly 104. Also, in an embodiment, one or more hand holds 124 can be cut into cover panels 122 attached to the vertical frame assembly 102.

With reference to FIGS. 1-8 and 21, a transparent forefoot support panel 501 can be removably attached to the base assembly 104 at a joint edge 127 located proximate to the first end of the base assembly 104. Conversely, the panel 501 may be fixedly attached to the base assembly 104. In other embodiments, the panel 501 may be replaced by other structures capable of supporting a user's foot when the scanner 100 is in use.

Figure 2:
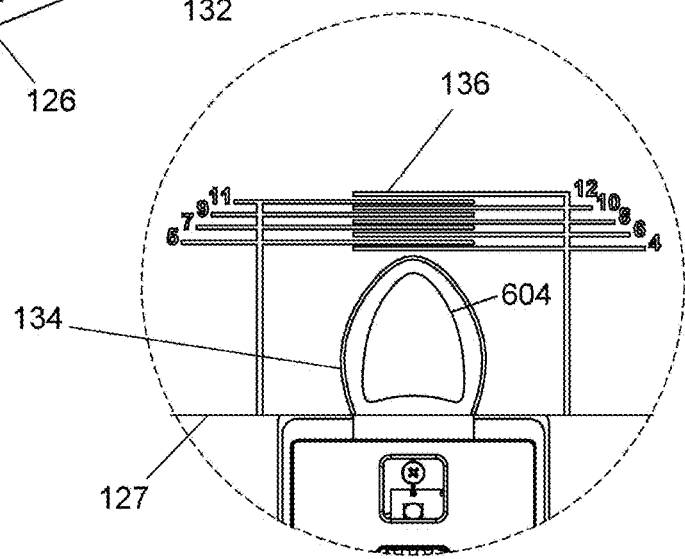
FIG. 2 is an enlargement of a portion encircled in FIG. 1.

A front portion of the top panel 130 proximate the first end 112 of the base assembly 104, forms a platform for the foot to be scanned. As best shown in FIG. 2, one or more distinctive markings 136 may be included on the top panel 130 that correspond to various shoe length sizes. In an embodiment, these markings 136 may be a number which is colored, such as white, red, or other prominent color, or textured. In an embodiment, a target 134 is included that indicates to the user where the ball of the foot should be placed. The target 134 may be a raised platform portion of the top panel 130 to place the ball (forefoot) of the user's foot upon, or may be a colored marking corresponding to a possible shape of a foot. The scanner 100 may include one or more weight sensors to measure weight force, such as weight sensor 604. As used herein, the terms "weight sensor" and "pressure sensor" are meant to convey the same meaning and are used interchangeably.

A top cover 123 (see FIG. 1) can be attached to the vertical frame assembly 102 along the top of the scanner 100 proximate the second end 110 of the vertical frame assembly 102. One or more power and/or data cables (not shown) can be passed through a cable hole (not shown) in the top cover 123. A graphical user interface (GUI) 120 can be attached to the top cover 123 of the vertical frame assembly 102. In an embodiment, the GUI 120 of the scanner 100 may be controlled via a touch screen, while in other embodiments, rubber or deformable buttons or any other means of controlling a GUI known in the art may be used. In other embodiments, the GUI 120 may be preprogrammed with an algorithm to direct a plurality of cameras 116 contained in the scanner 100 to capture a set of data points of a user's foot when initiated by a user. In other embodiments, the scanner 100 may have any other mechanism through which the cameras are instructed to capture various data points of a user's foot.

Figure 1:
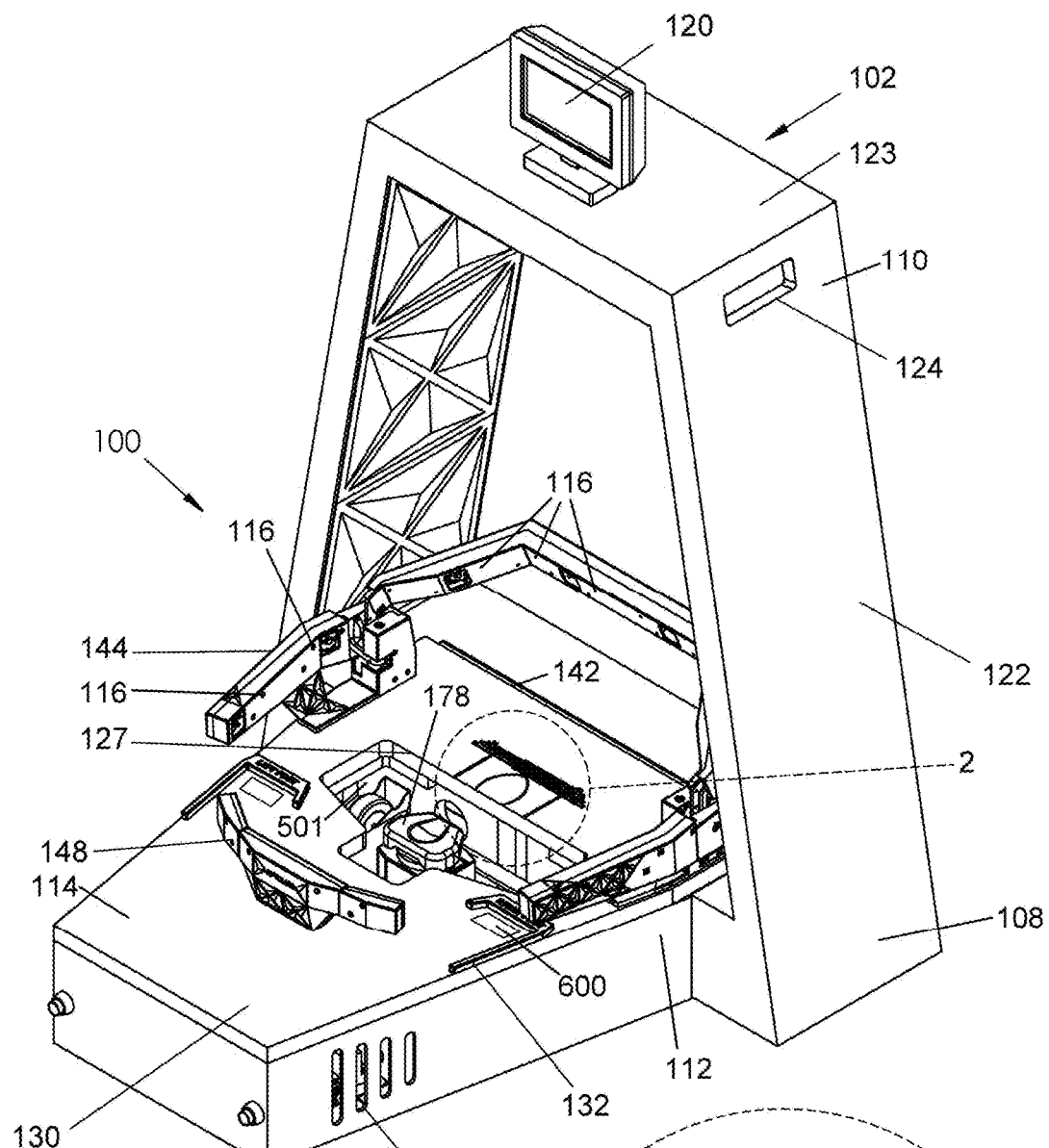
FIG. 1 is a frontal perspective view of a preferred embodiment of the three-dimensional scanner of the present invention.
Figure 7:
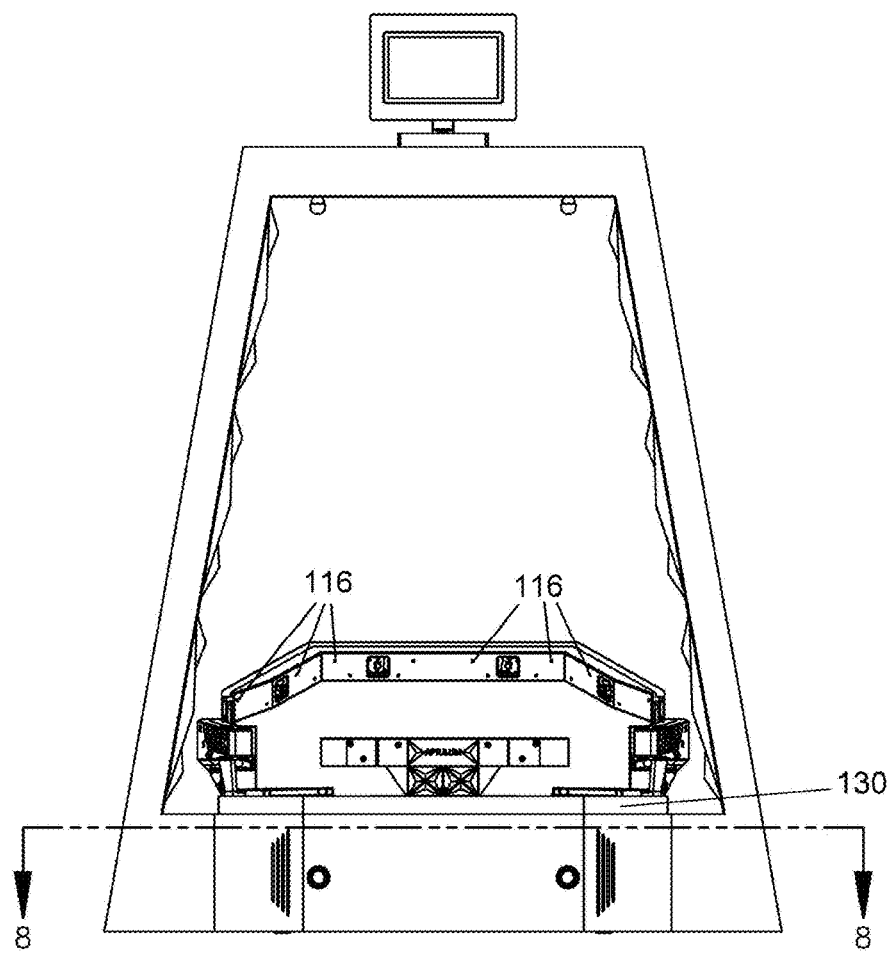
FIG. 7 is a rear elevational view of the scanner shown in FIG. 1.

FIGS. 4 and 6-8 show various camera sub-assemblies that are housed within the folding base assembly 104 according to an embodiment of the present invention. As will be evident to one skilled in the art, each camera sub-assembly comprises a plurality of cameras 116 capable of ascertaining the dimensions of the user's foot (see FIGS. 1 and 7 showing some of the cameras 116). In one embodiment, the camera sub-assemblies are positioned generally spherically around the foot. Other positional orientations such as, but not limited to, oval, are also envisioned. A front camera sub-assembly 144 (see FIGS. 1 and 4) mounts to the base plate 168 (see FIG. 5) directly or via an optional hinge (not shown). Alternatively, the front camera sub-assembly 144 can be configured to not extend past the vertical frame assembly 102 when the folding base assembly 104 is rotated 90 degrees to its closed position. In this embodiment, the optional hinge (between the base plate 168 and camera sub-assembly 144) would be omitted. An under-foot camera sub-assembly 146 (see FIG. 8) is fixedly attached to the base plate 168. A rear camera sub-assembly 148 (see FIG. 1) is fixedly attached to the top panel 130. Thus, in this embodiment, the rear camera sub-assembly 148 is attached directly to the folding base assembly 104. In other embodiments, the rear camera sub-assembly 148 is attached directly to a rear foot support 118.

Figure 24:
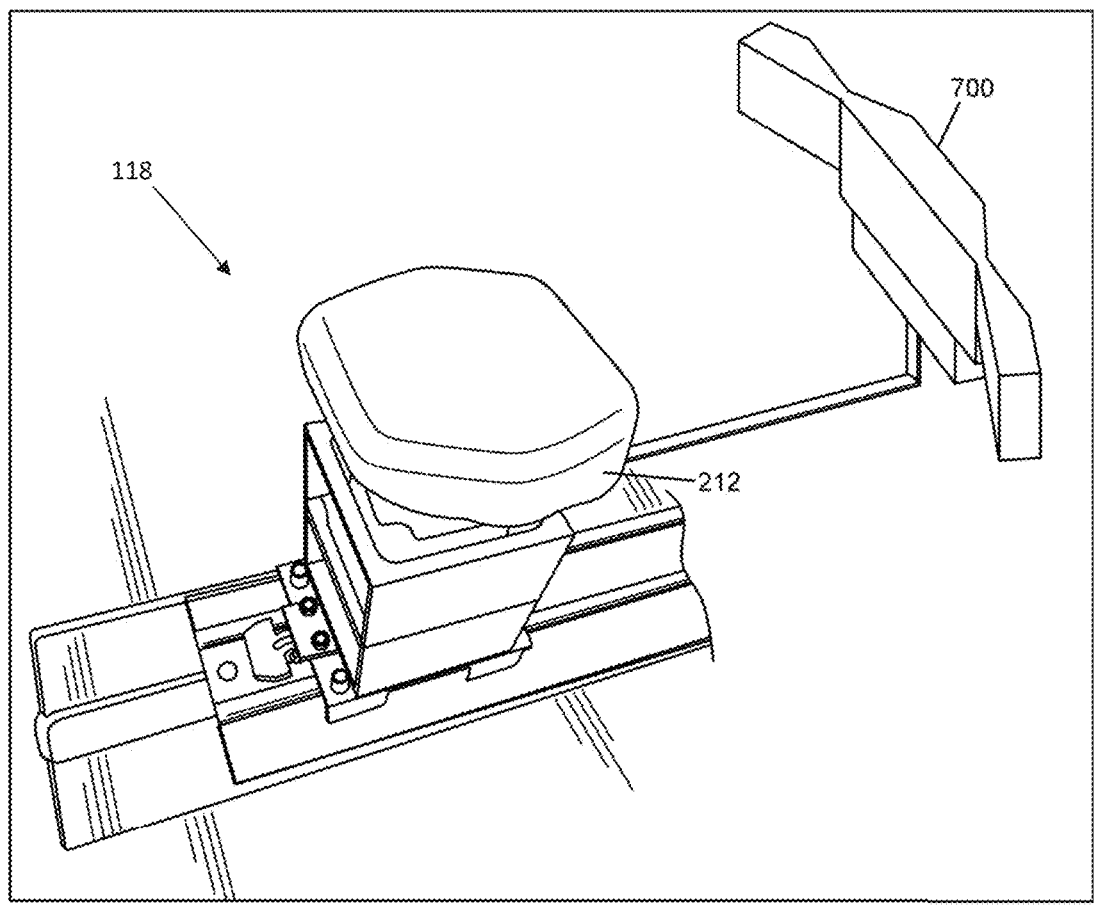
FIG. 24 is a perspective view of an embodiment of a rear foot support wherein the rear camera sub-assembly is connected with the rear foot support.

Another embodiment of this construction is depicted in FIG. 24, with the rear camera sub-assembly 700 being fixedly attached to the rear foot support 118, thereby allowing a rear camera sub-assembly 700 to rise and fall with the user's heel height position. As will be described in more detail below, the rear foot support 118 comprises a heel support sub-assembly (for instance, heel support sub-assembly 178) and horizontal and vertical actuator sub-assemblies (for instance, horizontal and vertical actuator sub-assemblies 180, 182, respectively). As will also be described in more detail below, this embodiment uses the same mechanical mechanism that is used to position the heel support plate 212. Each of the camera sub-assemblies 144, 146, 148 contain a sufficient number of cameras individually, and collectively, to capture data in synchronous or nearly synchronous fashion. Specialized socks 101 (see FIG. 15) may be provided with a specialized pattern that may improve the quality of the scan data captured by the camera sub-assemblies 144, 146, 148 and, thereby, create a more accurate image of the user's foot.

FIG. 8 is a sectional view taken along line 8-8 of FIG. 7. FIG. 8 depicts the folding base assembly 104 without the cover panels 122 showing the location of various electrical sub-assemblies. A plurality of mounting plates 171 are disposed throughout the base assembly 104 to allow fixation of other structures of the scanner 100. The mounting plates 171 can be made of metal, a rigid plastic or any other suitable material known in the art. In an embodiment, a power hub and converter sub-assembly 172 (see FIG. 5) is attached to the mounting plate 171, the mounting plate 171 being attached to the structural frame 140 of the base assembly 104. In a further embodiment, a first electronic sub-assembly 174 and a second electronic sub-assembly 176 are each mounted to mounting plates 171, each of these mounting plates 171 being attached directly to the structural frame 140. In an embodiment, a plurality of wheels 170 (see FIG. 5) capable of facilitating transport of the scanner 100 can be attached directly to the structural frame 140 of the vertical frame assembly 102.

FIGS. 9-12 depict various mechanical sub-assemblies used to position the foot for scanning in isolation, which collectively form the rear foot support 118. In an embodiment, the mechanical sub-assemblies are attached directly to the base plate 168. A height and axial positionally adjustable rear foot support 118 is provided by a horizontal linear actuator sub-assembly 180 that is attached to a vertical linear actuator sub-assembly 182 by a carriage adapter plate 284 fixed to a carriage 246 (see FIGS. 9, 11 and 12). In this embodiment, a heel support sub-assembly 178 can be attached to the vertical linear actuator sub-assembly 182 through a vertical lead screw 222 (see FIGS. 9 and 10). As used herein, the terms "heel support", "heel support sub-assembly", and "pivotal heel support" are meant to convey the same meaning and are used interchangeably.

Referring still to FIGS. 9-12, a torsion prevention sub-assembly 184 can be attached to the heel support sub-assembly 178 via L-brackets 220. In an embodiment utilizing L-brackets 220, the brackets 220 can be attached to a torsion prevention plate 260 (see FIG. 12) and a heel support adapter nut 210 (see FIG. 10). A weight sensor 620 (only shown schematically) is operatively associated with the adapter nut 210. The weight sensor determines the weight force provided by a rear portion of a shoe wearer's foot. The purpose and mechanism of these mechanical sub-assemblies will be described in more detail below.

FIG. 10 is an exploded perspective view of the heel support sub-assembly 178. A block 214 and a heel support hinge 218 are attached to the heel support adapter nut 210. The heel support hinge 218 pivots vertically along a pivotal axis within the plane of adjustment 300 of the heel support sub-assembly 178 (see FIG. 14). The heel support hinge 218 is also attached to a heel support plate 212. The hinge 218 may also be provided with an angular friction mechanism including, but not limited to, one or more set screws, torsion screws or other angular friction mechanism known in the art. The hinge 218 allows free rotation of the heel support plate 212. In the embodiment shown, the rotation of the hinge 218 is restricted to a range of approximately 20 degrees of motion by the block 214 and an angled face 216 on the adapter nut 210. In other embodiments, the rotation range can be greater or less than 20 degrees.

Referring to FIG. 9, in an embodiment, the heel support sub-assembly 178 includes a heel support plate cover 230 that wraps over the heel support plate 212. The heel support plate cover 230 is made of any soft, gripping, and stretchable material such as rubber, vinyl or any other suitable material known in the art. In an embodiment, a heel positioning concavity 232 is located at approximately the center of the heel support plate cover 230 and functions to center the user's heel over the center of rotation of the heel support hinge 218 when a user's foot is placed therein (see FIG. 9).

Continuing to refer to FIG. 9, the horizontal linear actuator sub-assembly 180 includes a horizontal sub-assembly adapter plate 250, which is attached to the base plate 168. A linear rail 248 is attached to the carriage 246. Both the linear rail 248 and the carriage 246 are attached to the horizontal sub-assembly adapter plate 250. The linear rail 248 restricts the motion of the carriage 246 to a single axis. In the embodiment shown, a horizontal lead screw adapter 244 is mounted on the carriage adapter plate 284 and joins a horizontally-mounted linear actuator 240 via a horizontal lead screw 242. In this embodiment, one or more set screws are utilized to lock the horizontal lead screw 242 into the horizontal lead screw adapter 244, thereby preventing rotation.

FIG. 9 further illustrates the vertical linear actuator sub-assembly 182, which includes a linear actuator support structure 282 that is attached to the carriage adapter plate 284, which is connected to the horizontal linear actuator sub-assembly 180. A vertically-mounted linear actuator 280 is attached to the linear actuator support structure 282 and provides vertical movement for the heel support sub-assembly 178 via the vertical lead screw 222. A side rail 264 is attached to the side of the linear actuator support structure 282 and is connected to the torsion prevention sub-assembly 184.

The torsion prevention plate 260 includes a small carriage 262 which slides along the side rail 264. The torsion prevention plate 260 resists rotational motion of the heel support adapter nut 210 as the torsion prevention plate 260 is connected to the linear actuator support structure 282, thereby being able to withstand the rotational motion of the heel support adapter nut 210. This connection restrains the motion of the heel support sub-assembly 178 to a single axis.

FIG. 14 depicts a side elevational view of the heel support sub-assembly 178 and the connected mechanical sub-assemblies that provide vertical and horizontal motion to the heel support sub-assembly 178. The heel support plate 212 can be positioned anywhere in the plane of adjustment 300 of the heel support sub-assembly 178 by using independent horizontal and vertical positioning mechanisms. In an embodiment, the heel support sub-assembly 178 may be movable by a pneumatic or hydraulic powered adjuster or by a manually-operated mechanical device such as one driven by a screwdriver or other similar mechanism. The adjuster can adjust the wedge angle in response to several variables to ensure that the foot is in the most desired position prior to initiation of the foot scan.

As shown in FIG. 11, a portion of the under-foot camera sub-assembly 146 includes, among one or more other cameras not shown, a camera 198 fixed to the heel support sub-assembly 178. In this embodiment, the camera moves with the heel support sub-assembly 178 and thereby potentially provides a more accurate scanning ability.

Figure 18:
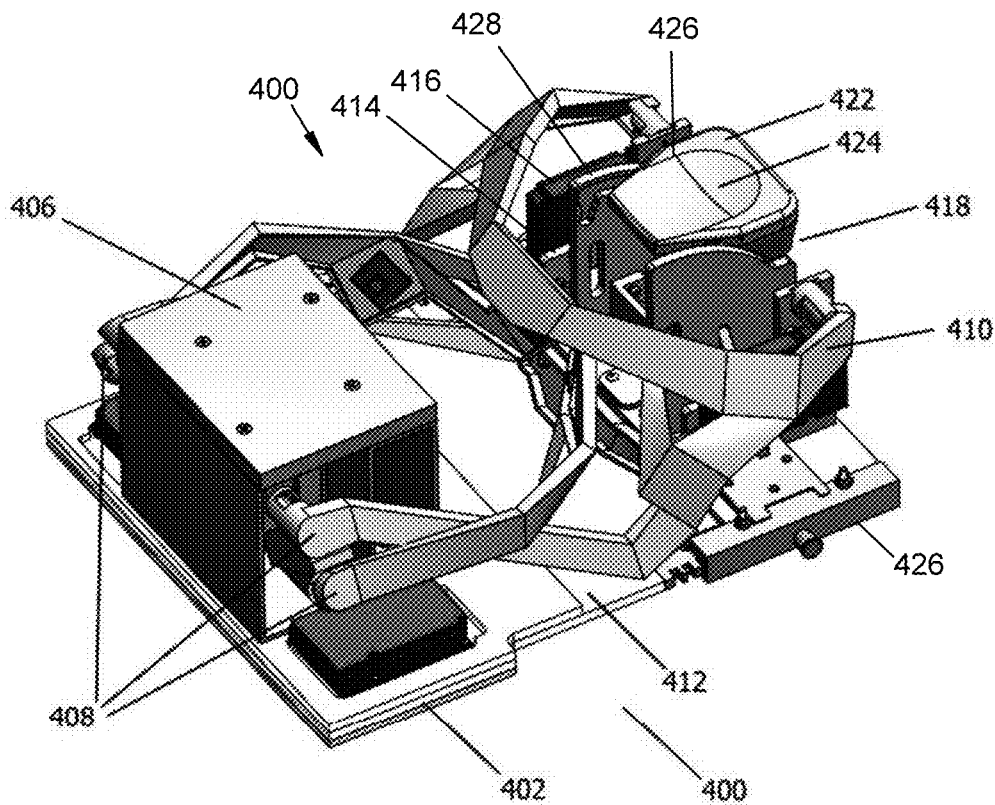
FIG. 18 is a perspective view of an alternative embodiment of the foot scanner according to the present invention.

FIG. 18 depicts an alternative embodiment of the present invention. A three-dimensional inclined foot scanner 400 includes a structural framing 402 comprised of one or more plates alone or fastened, fused or otherwise provided together. In an embodiment, the structural framing 402 includes three plates fastened together. The framing 402 can be made of any rigid material, in any general shape, consisting of at least one plate. In an embodiment, grooves can be added to a bottom side of a middle plate (not shown) for wiring to be run internally from a first end to a second end opposite the first end.

The scanner 400 is further comprised of a forefoot support sub-assembly 406, a non-automated horizontal sliding sub-assembly 426, and a non-automated vertical track sub-assembly 428. The forefoot support sub-assembly 406 is attached to the structural framing 402. The forefoot support sub-assembly 406 can be made of any rigid material, in any shape, with an installed height equal to that of a heel support sub-assembly 418 height.

The non-automated vertical track sub-assembly 428 is attached to the non-automated horizontal sliding sub-assembly 426. In an embodiment, the non-automated horizontal sliding sub-assembly 426 is translated along the top of a base plate 412 by the user releasing locking pins (not shown) and applying a horizontal force. However, other known methods of single-axis horizontal motion can be used to translate the non-automated horizontal sliding sub-assembly 426. The non-automated vertical track sub-assembly 428 is comprised of at least one rigid, vertically mounted component having a grooved path. In an embodiment, two vertically mounted components having mirrored grooved paths constrain the vertical and rotational path of motion of the heel support sub-assembly 418 having irregularly shaped mirrored pins inserted into the respective grooves.

The heel support sub-assembly 418 includes a heel support plate (not shown) and a heel support plate cover 422. The heel support plate cover 422 wraps over the heel support plate 420 and is made of any soft, gripping, and stretchable material such as rubber, vinyl or any other suitable material known in the art. A heel positioning concavity 424 positions the heel of the user's foot on the heel support plate 420 at approximately the center of the heel support plate 422.

A front camera sub-assembly 408 is attached to the forefoot support sub-assembly 406 and can fold inward to decrease its outermost dimensions. A plurality of mounting plates (not shown) can be disposed throughout the frame 402 to allow fixation of one or more electrical assemblies 416 and a rear camera sub-assembly 410 to the frame 402. The mounting plates 414 can be plastic, metal or any other rigid material known in the art. The rear camera sub-assembly 410 can fold inward to decrease its outermost dimensions.

As will be evident to one of ordinary skill in the art, the scanner 400 can be portable, or it can be fixed in a particular location.

In an embodiment shown as in FIG. 20, one or more targets 495 are provided to aid in the locational calibration of the rear camera sub-assembly 410. In an embodiment, one or more targets 495 can be RAD targets. RAD is a term known to those skilled in this relevant art.

In an embodiment as shown in FIG. 21, a cut-out 500 in the top panel 130 for accommodating an under-foot camera sub-assembly 510 has a transparent cover 501 to keep out dust, dirt and other contaminants. A longitudinal slot 502 is provided to accommodate longitudinal travel of the rear foot support 118.

In an embodiment as shown in FIG. 22 one or more camera units 506 are placed on a hinged 508 stand 510 to allow for the fine adjustment of the shooting angle of the one or more camera units 506. In an embodiment as shown in FIG. 23, one or more camera units 512 are placed on a stand 514 supported on a ball (not shown) or other suitable connection mechanism to allow for the fine adjustment of the shooting angle of the one or more camera units 512.

As shown in the embodiment depicted in FIG. 20, LED lighting 520 may be added to aid in capturing a refined image of the foot. Typically, the lighting 520 is positioned such that it can provide adequate illumination to the foot from underneath the foot.

Figure 25:
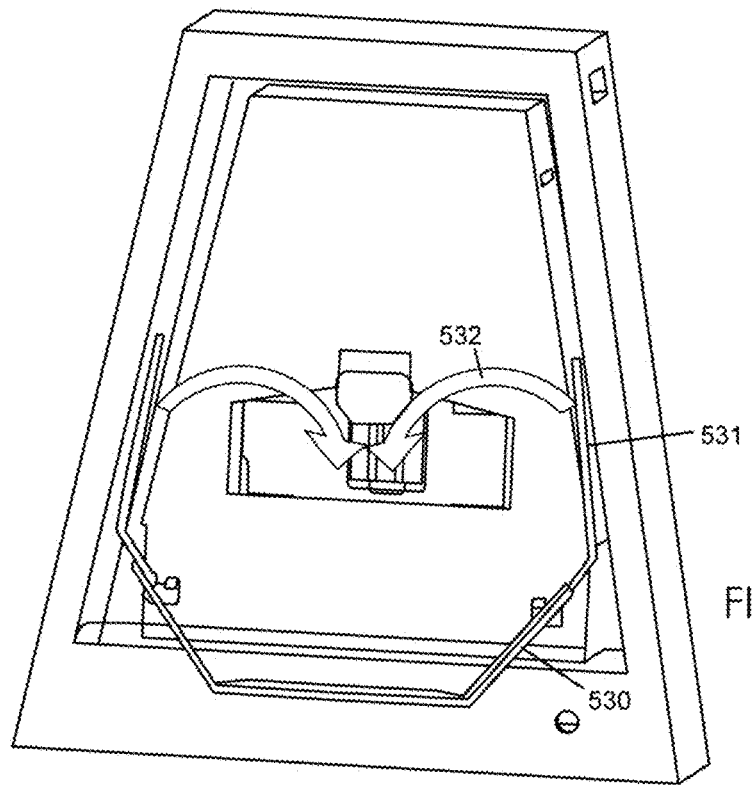
FIG. 25 is a rear perspective view of an embodiment of the invention with a foldable front camera sub-assembly.
Figure 26:
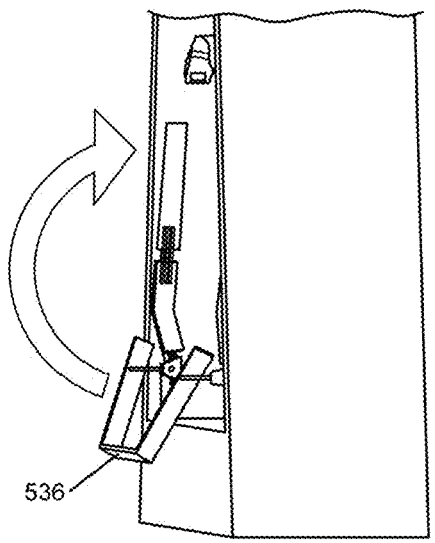
FIG. 26 is a side perspective view of another aspect of the embodiment shown in FIG. 25.

In an embodiment as shown in FIG. 25, a front camera sub-assembly 530 has folding sidearms 531 folding inwardly to reduce overall size for storage. In an embodiment as shown in FIG. 26, the top camera assembly 536 is capable of folding inwardly for storage. The top camera sub-assembly 536 is folded rearward toward the rear foot support 118. When folded, the top camera sub-assembly 536 fits within the A-frame of the scanning unit.

FIGS. 27B and 27C depict heel positioning concavities 232a, 232b that may be located on the heel support plate 212. The heel positioning concavities 232a, 232b include a concave shaped area at approximately the center of the heel support plate 212 that receives the heel of a user's foot at a lower position than the heel support sub-assembly 178. This may result in a reduction in wedge angle that may decrease forefoot pressure and increase heel pressure, which translates into a perceived increase in comfort for the high heel wearer. The heel position concavity 232 also provides additional stability for a user.

Referring to FIG. 27B, the heel positioning concavity 232a includes a concave shaped area under the center of the heel that is not lower than the heel seat plane of the heel support plate 212. Such embodiment may be used for indexing the location of the user's heel during scanning. Referring to FIG. 27C, the heel positioning concavity 232b may be contoured such that the center of the heel is lowered below the heel seat plane of the heel support plate 212. In further embodiments, the heel positioning concavity may be contoured such that the center of the heel is indexed on the top plane of the heel support.

In an embodiment, the depth in the center of the heel positioning concavity 232 is about 0.1875 inches. In other embodiments, the depth may be greater or less than 0.1875 inches. In further embodiments, the depth in the center of the heel positioning concavity 232 is about 0.75 inches. The depth may be limited by the length of the heel positioning concavity 232 and the anatomical structure of the foot.

The method of operation of the scanner 100 will now be described. Initially, a user removes their existing footwear and, optionally, puts on specialized socks 101 (see FIG. 15). The socks 101 may be configured with a particular pattern that improves the ability of the scanner 100 to create an accurate image of the user's foot. Next, the user stands on the folding base assembly 104, optionally wearing the provided socks 101, with feet on either side of the heel support sub-assembly 178. The top panel 130 can have a non-slip coating applied thereon (not shown). The non-slip coating can be an abrasive, textured coating or a non-abrasive type of coating. In an embodiment, if necessary, the user can grip the scanner 100 via hand holds 124 on the sides of the vertical frame assembly 102 for optional balance support. The user may then interact with the scanner 100 through a graphical user interface (GUI), such as GUI 120 (see FIG. 1). Alternatively, another individual may interact with the scanner 100 through the GUI 120 to initiate use of the scanner 100. In other embodiments, the user or another individual may interact with the scanner 100 through one or more various other mechanisms known in the art.

Once the GUI 120 has been accessed, the user is prompted to provide basic customer information, which can be saved and associated with the three-dimensional data that will be collected. The user is then prompted by the GUI 120 to select or estimate their closest athletic shoe size (see FIG. 13). After a size is selected, the heel support sub-assembly 178 (which is initially located at position zero) is translated horizontally by the horizontal linear actuator sub-assembly 180 toward the joint edge 127 until the distance between the joint edge 127 and the back of the heel support sub-assembly 178 is approximately two-thirds the length of the athletic shoe size selected (the first position).

The GUI 120 then prompts the user to place one of their feet such that the center of the user's heel is centered in the heel positioning concavity 232 on the heel support plate 212. In an embodiment, the user's foot can be positioned on the forefoot support panel 501 such that the joint line (see FIG. 19) is aligned with the joint edge 127. The user is then instructed to stand naturally, evenly distributing body weight between both feet. The user then initiates data capture at a starting height of 0 inches while remaining stationary. In an embodiment, data capture can be initiated via the GUI 120.

In an embodiment, following data capture, the heel support sub-assembly 178 automatically repositions the user's foot to the next programmed heel height position. The user's foot is translated horizontally, towards the joint edge 127, and vertically, to the next heel height position. Increasing the heel height position from the flat-foot position sets the user's foot at an incline which shortens the horizontal length of the foot. The wedge angle (see 370 in FIG. 16 for reference) is also introduced by an increase in heel height. In an embodiment, the heel support hinge 218 allows free rotation of the heel support plate 212. In this embodiment, as the incline of the user's foot changes, the wedge angle freely increases or decreases to best match the wedge angle naturally observed by the user.

The user repeats the data capture process for all heel height positions. In an embodiment, the heel support sub-assembly 178 moves to the next height position (e.g., to a heel height of 1 inch, 2 inches, etc., or any other preprogrammed height greater than zero if starting from the flat-foot position). The user then initiates data capture and the scanner 100 saves the scanned data. Alternatively, the scanner 100 may initiate data capture once the foot has been moved into the proper position without the user or other individual input. The heel support sub-assembly 178 is then moved to the next preprogrammed position. This movement can be automated or non-automated. In an embodiment, the GUI 120 is programmed to guide the user through heel height positions at 0 inches, 2 inches, 3 inches, and 4 inches. In other embodiments, other heel height positions can be used, and more or less heel height positions can be used.

After scan data of the user's foot has been captured and saved for each programmed heel height position, the heel support sub-assembly 178 automatically returns to the flat-foot starting position (e.g., 0-inch heel height position). The user is then prompted to switch feet, placing the first foot on the folding base assembly 104 and the other foot on the heel support plate 212 and forefoot support panel 501 aligned with the joint edge 127 as described above. The process described above for capturing scan data of the first foot is repeated for the other foot. The GUI 120 can inform the user when all scanning is complete, and the user may then move off of the scanner. After the user moves off of the scanner 100, the heel support sub-assembly 178 can return to the flat-foot position.

In an embodiment, the heel height positions do not have to be pre-programmed and may be selected or input by the user or other individual. The required change in horizontal positioning as heel height increases is accounted for with a formula or algorithm that may be dynamically calculated based on user input as is well-known in the art. In an embodiment, suitable formulas or algorithms that are well-known in the art for dynamically calculating the required change in horizontal positioned as heel height increases, may be used. These formula or algorithms can be run by a processor contained within the scanner 100.

In an embodiment, initially, the formula or algorithm identifies a user's foot and partitions the foot into two sections divided by a joint line (see FIG. 19). Using a linear model, trigonometry can be used to calculate the change in foot length introduced by an increase in heel height. The total length of the foot is required for this calculation and can be obtained from standard US women's footwear sizing. The heel height is also required and can be predefined or input by the user or other individual. In an embodiment where the heel height is not dynamically calculated, the change in length associated with a specific heel height can be calculated for all sizes, averaged, and applied to the preselected heel heights, independent of the user's athletic shoe size. Any heel height is acceptable between 0 inches (flat foot) and a heel height of 4.2 inches (suggested anatomical maximum).

In an embodiment, the wedge angle rotation axis can be offset from the center of the user's heel. In this embodiment, another calculation using similar trigonometric methods known in the art can be undertaken to account for the horizontal motion introduced by the offset rotational axis.

In various embodiments, the scanner 100 can include additional features to improve the scan data that is captured. In an embodiment, the scanner includes non-scanning foot locators 132. The locators 132 include one or more weight sensors 600 to calculate the weight of a user's non-scanning foot. In an embodiment, weight sensor 604 and weight sensor 620 are provided in connection with rear foot support 118 to capture additional information about the user such as the user's weight and weight distribution. A determination can be made as to the proper weight distribution between the non-scanned foot and the scanned foot. Upon recognition of the proper ratio of weight, the scanning process will be initiated.

Additionally, for some applications, there is a preferred ratio of weight placed on the forefoot of the shoe versus weight placed on the heel portion of the foot. Typically, the greater the heel height, the more desirable it is that the weight distribution between the heel and the forefoot be greater in the heel. In other words, for higher heel heights, the weight distribution between heel and forefoot should favor the heel. The scanner can be programed to ensure proper weight distribution between the forefoot and heel before the scan is initiated.

The ideal wedge angle, as identified by the pivotal heel support, can be a function of various variables including, but not limited to, heel height, desired weight distribution between forefoot and heel, shoe length size, and heel support concavity positioning in relationship to the heel seat plane (see FIGS. 27A-27C). Additional variables may include foot shape or foot width size, and rigidity of the designated shoe material. A pneumatic or hydraulic bladder or other mechanical adjustment device may be utilized to adjust the heel support to obtain a desired wedge angle. In an embodiment, the scanner 100 will not initiate scanning until the desired or proper wedge angle is obtained. The adjustment of the wedge angle of the pivotal heel support can be completed in conjunction with various other functions that are examined and confirmed before scanning is initiated. The desired wedge angle may also be calculated based upon various variables, or directly specified through the GUI 120.

As will be evident to one of ordinary skill in the art, various alterations and modifications may be made without departing from the scope of the present invention. For instance, although linear actuators are shown in various embodiments of the present invention, any other method of linear or non-linear travel may be used for the rear foot support. The travel may be automated or non-automated. For example, if certain desired height positions produce a specific non-linear path, a non-automated two-axis positioning system may be used to position the heel support plate 212 at specific heights along that path.

In an embodiment, the scanner 100 captures user scan data using photogrammetry with a series of nearly synchronous cameras around the foot. The scanner 100 may include any sufficient number of cameras 116 and be configured to achieve synchronous, including simultaneous or nearly simultaneous, data capture. In an embodiment, this number of cameras 116 is at least fifteen. In other embodiments, more or less than fifteen cameras 116 may be used. In further embodiments, the scanner 100 may use alternative methods of 3D scanning such as laser or white light or other methods known in the art.

The forefoot support panel 501 may be inclined, or an additional inclined component may be added to position the user's forefoot at an upward incline to simulate the toe spring of potential footwear (see FIG. 16).

Although an embodiment of the present invention depicts an A-style structural support frame, the frame may be any shape or size capable of housing the necessary electrical and mechanical components, folding for transport, and supporting the body weight of a user. Other embodiments may include a smaller or larger design that is lightweight, weight bearing or non-weight bearing, non-automated, folding or non-folding, and portable or fixed, provided the design utilizes the same inclined positioning system and general electronics. Pressure sensors may be placed in the heel support plate 212 and the forefoot support panel 501. The resultant data can then be recorded and saved with the other 3D scan data. Three-dimensional data may also be collected without the use of a patterned sock.

What is claimed is:

1. An adjustable inclined foot scanner comprising:
a frame having a connected platform;
a positionally adjustable rear foot support connected to the frame and movable with respect to the platform in a first plane about a vertical axis and a horizontal axis;
an automatically adjustable rigid heel support pivotally mounted on the rear foot support along a pivotal axis perpendicular to the first plane, the pivotal heel support includes a heel support plate and a heel positioning concavity formed therein, wherein the pivotal heel support is configured to automatically position a user's foot at a wedge angle based on the user;
a front foot scanning assembly having at least one front foot camera directed to a front portion of the platform;
an underfoot scanning assembly having at least one underfoot camera positioned approximate an underside portion of the platform, wherein the at least one underfoot camera has an unimpeded view between the rear foot support and the platform; and
a rear foot scanning assembly having at least one rear foot camera directed to a rear portion of the platform;
wherein the front foot scanning assembly, the underfoot scanning assembly, and the rear foot scanning assembly cooperatively form a three-dimensional camera scanning system that synchronously captures scan data.

2. The foot scanner of claim 1, wherein at least one of the underfoot and rear scanning assemblies is connected with the rear foot support.

3. The foot scanner of claim 1, wherein at least one of the platform and rear foot support has a scanning foot weight sensor.

4. The foot scanner of claim 3, wherein the platform and the rear foot support both include scanning weight sensors.

5. The foot scanner of claim 1, wherein the wedge angle is reached as a function of the user's body weight, foot shape, foot size, and heel height position.

6. The foot scanner of claim 1, wherein the heel positioning concavity is formed at a height equal to or above a heel seat plane of the heel support plate.

7. The foot scanner of claim 1, wherein the heel positioning concavity is formed at a height below a heel seat plane of the heel support plate.

8. The foot scanner of claim 1, wherein adjustment of the heel support allows the heel seat plate and the positioning concavity to reach a wedge angle based on user characteristics after each adjustment.

9. The foot scanner of claim 3, further comprising a weight sensor for a foot not being scanned to aid in determining the weight force distribution between a user's foot being scanned and the user's foot not being scanned.

10. The foot scanner of claim 1, comprising at least one target to calibrate an appropriate position of at least one scanning assembly with reference to the foot scanner.

11. A method of utilizing the foot scanner of claim 1, comprising the steps of:
confirming the proper weight force distribution between the foot being scanned and the foot not being scanned; and
initiating scanning of the foot.

12. A method of utilizing the foot scanner of claim 1, comprising the steps of:
confirming the proper weight force distribution between the platform and the rear foot support; and
initiating scanning of the foot.

13. A method of utilizing the foot scanner of claim 1, comprising the steps of:
allowing the heel support to assume a natural position; and
initiating scanning of the foot.

14. A method of utilizing the foot scanner of claim 1, comprising the steps of:
defining a desired heel support angle using a variable selected from the group consisting of shoe length size, shoe width size, designated shoe material, shoe wearer total weight, weight force on the platform, weight force on the rear foot support, ratio of weight force on platform versus weight force on the rear foot support, heel height of the rear foot support, heel support positioning concavity, and heel support positioning concavity in relationship to a heel seat plane;
adjusting the heel support to the desired angle; and
initiating scanning of the foot.

15. The method of utilizing the foot scanner of claim 2, comprising the steps of:

first confirming the proper weight force distribution between the platform and the rear foot support; and
initiating scanning of the foot.

16. An adjustable inclined foot scanner comprising:
a frame having a raised platform;
an automatically height adjustable rear foot support with a rigid pivotal heel support having a heel support plate and a heel positioning concavity located thereon, wherein the pivotal heel support is connected to the rear foot support, wherein the height adjustable rear foot support is offset from the raised platform, wherein the rear foot support, the heel support, and the platform do not contact an arch of a user's foot during scanning, wherein the pivotal heel support communicates with the platform to allow a user's foot to reach a wedge angle related to a combination of a user's body weight, foot shape, foot size, and heel height position;
two or more camera devices capable of utilizing a method incorporating an algorithm for initializing a three-dimensional scan and data capture, wherein the algorithm is capable of arranging the captured data in a manner specific to the method such that the three-dimensional scan covers a majority of the foot including the arch; and
one or more camera sub-assemblies connected to the rear foot support, wherein the one or more sub-assemblies each include at least one camera and one or more paths for the horizontal and vertical translation of the rear foot support in relation to the raised platform;
wherein the two or more camera devices and the one or more camera sub-assemblies perform a synchronous three-dimensional scan and data capture.

17. The foot scanner of claim 1, wherein the three-dimensional camera scanning system includes at least six cameras.

18. The foot scanner of claim 17, wherein the three-dimensional camera scanning system includes ten to eighteen cameras.

* * * * *